May 22, 1951　　　　M. KAPLOWITZ　　　　2,554,333
CAMERA LATCH
Filed Feb. 3, 1948　　　　　　　　　　　　2 Sheets-Sheet 2
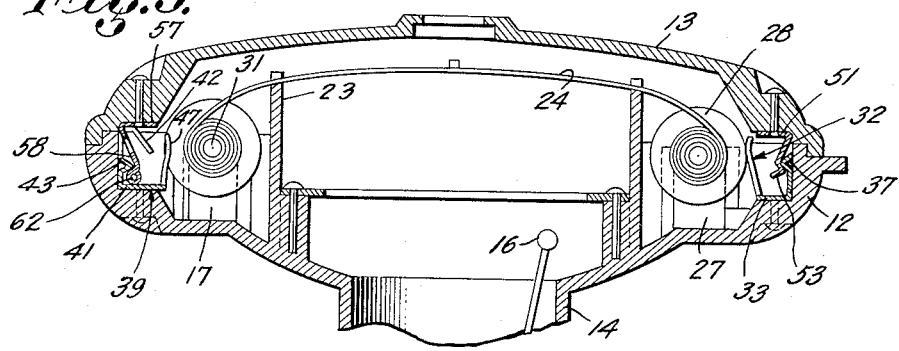
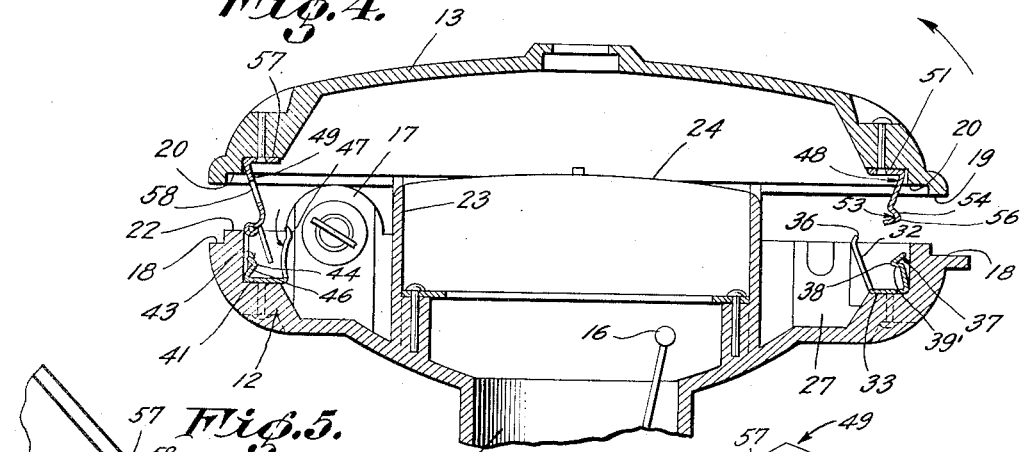
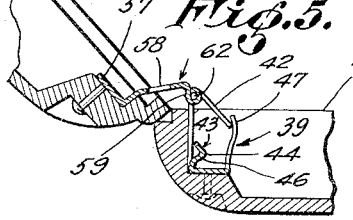
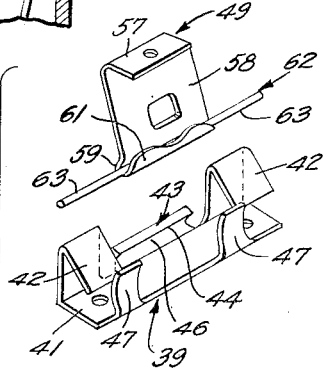
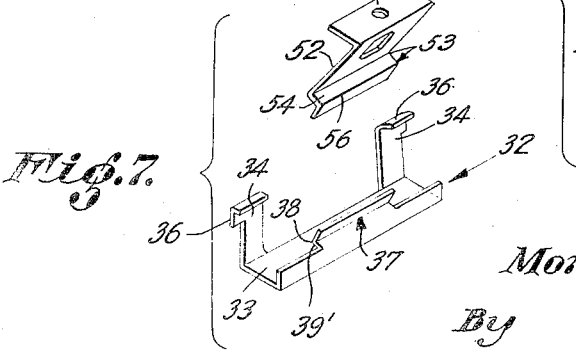
Inventor:
Morris Kaplowitz,
By
His Agent.

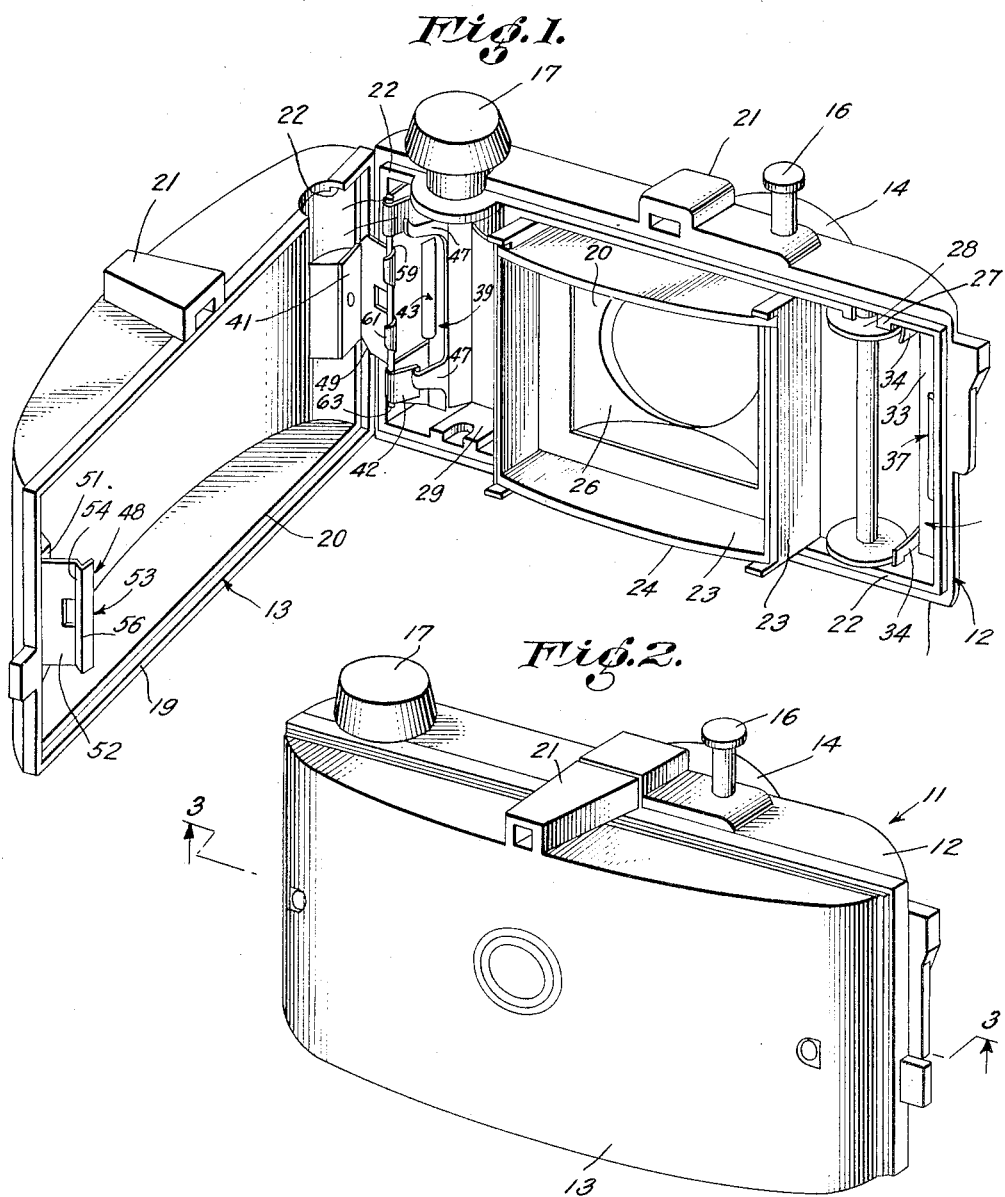

Patented May 22, 1951

2,554,333

UNITED STATES PATENT OFFICE 2,554,333

CAMERA LATCH

Morris Kaplowitz, Brooklyn, N. Y., assignor to Federal Manufacturing & Engineering Corp., a corporation of New York Application February 3, 1948, Serial No. 5,925

4 Claims. (Cl. 95—31)

The invention relates to photographic cameras and relates more particularly to locking mechanisms for photographic cameras.

Rollfilm cameras, especially of the inexpensive type, usually are made of two separable parts for easy loading and unloading of the camera. Conventionally, these parts are hinged together at one edge and are provided at the other edge with a snap-lock or are fitted to hold together by friction. It has been found, however, that the hinge on one end of the camera as well as the snap lock or friction device on the other end soon wear out, and unintentional opening of the camera body or the intrusion of light often result from this wear. Furthermore, whenever the two parts jam and it becomes difficult either to open or to close the camera body for the purpose of loading or unloading, amateur photographers often apply force to overcome the jamming, and this results in damaging the hinge or the lock or both. Moreover, the hinge as well as parts of the lock are usually visible from the outside, and in many instances mar the ornamental appearance of the camera.

The instant device has among its aims to obviate the deficiencies of the prior art and to provide for resilient hinging of the camera body parts and for accurate and dependable locking thereof.

It is therefore one of the principal objects of the invention to provide a camera with releasable locking means for the camera parts that will keep the camera closed.

Another object of the invention is the provision of a concealed latch and hinge that are invisible when the camera is closed.

A further object of the invention is to provide a hinge between the camera parts that is resilient and therefore capable of withstanding unskillful handling.

A still further object of the invention is the provision of locking means that will hold two camera parts together and at the same time keep the film in the camera tensioned.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the the specification.

In the accompanying drawings,

Fig. 1 is a perspective view of a camera, embodying the invention;

Fig. 2 is a perspective view of the camera shown in Fig. 1, but with the parts separated to permit inspection of the camera interior;

Fig. 3 is a sectional fragmentary view taken along line 3—3 of Fig. 1.

Fig. 4 is a sectional view similar to Fig. 3, but showing the camera parts separated, and omitting the film and spools;

Fig. 5 is a fragmentary sectional view of the hinge detail when the camera is completely open;

Fig. 6 is an extended view, in perspective, of two cooperating latching elements; and Fig. 7 is an extended view in perspective of two other cooperating latching elements.

In carrying the invention into effect in one of the embodiments which has been selected for illustration in the accompanying drawings and for description in this specification, and referring now particularly to Figs. 1 and 2, there is provided a rollfilm camera generally indicated at 11 that comprises two parts, a front part 12 and a rear part or cover 13. The front part has a lens barrel 14, a lens and shutter (not shown), a trigger 16 that extends to the exterior of the camera and a uni-directional winding knob 17 for the take-up spool. Both the front and the rear parts, 12 and 13, have a substantially rectangular contour formed by a contour edge 18 and 19, respectively, where two parts fit together to provide a complete enclosure. A view finder 21 surmounts the camera and is split in two portions, one being integral with the front part 12 and the other with the rear part 13.

Both camera parts are made of durable material, for instance of metal or of plastic. The front part 12 has a shoulder 22 near the contour edge 18 and on the inside thereof over which the projecting contour edge 19 of the rear part 13 fits accurately, to provide for light tightness when the parts are fitted together. The rear part or cover 13 has a recess 20 corresponding to the shoulder 22 of the front part 12.

An endless wall 23 is connected to the front part 12 and projects beyond the confines of the edge 18 and has a convex contour 24. The wall 23 surrounds a light chamber 26 and the convex contour 24 serves to support the film in exposure position in the camera to receive light by way of the light chamber 26.

Two supports 27 for a take-off spool 28 are located between the light chamber 26 and one of the longitudinal ends of the front part 12 and are oppositely disposed. A support 29 is provided between the chamber 26 and the other longitudinal end of the part 12 (see Figs. 3 and 4), near one sidewall and disposed opposite the winding knob 17, for supporting a take-up spool 31.

A latching element 32 is secured on the interior of the front part 12. This element consists of a single piece of thin metal or similar resilient material and has a base 33 that is riveted to a flat surface of the part 12, and extends transverse with relation to the longitudinal extension of the part 12. The base 33 has a length corresponding substantially to the width of the film used in connection with the camera. Two spaced resilient arms 34 are provided near the opposite ends on one side of the base 33 and are integral therewith. These arms 34 extend beyond the longitudinal ends of the base 33 and are tensioned in a direction towards the chamber 26. Each arm 34 resiliently bears against the periphery of a flange of the take-off spool 28, when the latter is inserted in the camera, to provide breaking action therefor to tension the film between the spools (see Fig. 3). When the take-off spool is removed from the camera, the arms 34 bear against one side of the opposite supports 27 (see Fig. 4). Each arm 34 is slightly bent backwards at the free end 36, to facilitate insertion of the take-off spool, so that the flange thereof will bend the arms 34 back, against their tension, when the take-off spool bearing the unexposed film is pressed into position on the support 27.

An integral projection 37 is secured to the opposite side of the base 33 and extends longitudinally thereon between the two arms 34, but is spaced therefrom. This projection 37 extends first inwardly with relation to the base 33 and then outwardly and consists of an angular piece having a longitudinal edge 38 and an inclined surface 39 forming an angle with the base 33. The major part of the element 32 is normally disposed within the confines of the shoulder 22 (see Fig. 4).

The projection 37 is tensioned for normally spacing the angular piece from the wall adjacent thereto, when the camera is open, as best shown in Fig. 4.

Between the support 29 and the other longitudinal end of the part 12, there is secured a second element 39, which is similar to the element 32, made of one piece of metal or similar resilient thin material. The second element 39 has a base 41 that is secured in the interior of the part 12, for instance by riveting. The base 41 has a length that is comparable to the width of the film used for the camera. Two hook-shaped portions 42 are connected to one side of the base 41 and are integral therewith, and an angular projection 43 is disposed therebetween, that is similar to the previously described projection 37. The angular projection 43 has an edge 44 and an inclined surface 46 which forms an angle with the base 41. Opposite each hook portion 42, a curved resilient arm 47 is located and said resilient arms 47 are curved concave relative to the position of the take-up spool to bear lightly against the film wound on the take-up spool for tensioning the same in addition to the tension provided by the uni-directional winding knob and the previously described braking action.

The angular projection 43 is supported resiliently and normally spaced from the adjacent side wall, when the camera is open, similar to the previously disclosed angular projection 37.

The rear part or cover 13 carries two latches 48 and 49. The latch 48 is arranged to cooperate with the element 32, and the second latch 49 is adapted to cooperate with the second element 39. By this cooperation the camera parts may be locked, and at the second latch and element, 49 and 39, also be hinged.

The latch 48 consists of a single piece of metal or other resilient material and comprises a base 51 that is riveted to the cover 13. A connecting piece 52 interconnects the base 51 with an angular portion 53 that includes a slanting surface 54 and an edge 56 forming the outermost part of the slanting surface 54. This slanting surface 54 is adapted to cooperate with the inclined surface 39' of the first element 32, and the connecting piece is so dimensioned that the two surfaces latch when the parts 12 and 13 are closely fitting together.

During the closing and opening of the camera, the edge 56 of the latch 48 slides past the edge 38 of the first element 32, and the connecting piece 52 is sufficiently resilient for this sliding and for subsequent latching. The angular portion 53 projects beyond the confine of the edge 19 (see Fig. 4).

After the latch 48 engages the element 32, the tension of the connecting piece 52 as well as that of the angular projection 37 operate both to assure a good fit during latching. The angular projection 37 is pressed towards the adjacent side wall, as best shown in Fig. 3. The side wall prevents further resilient yielding by the projection 37 and thus may act as an abutment. The resilient position of the latch part as well as the element part, provide for a double tension and spring action and also provide for a tolerance compensation in the event that the positioning of the element and latch in the camera parts, or even the camera parts themselves, are not entirely accurate in accordance with required production tolerances.

The second latch 49 comprises a base 57, a pin 62 and a connecting piece 58 that forms a slanting surface 59 and that is bent in the shape of a loop 61 to surround and to hold the pin 62 securely. The pin 62 projects sideways from both ends of the loop 61 in the form of two pintles 63. The slanting surface 59 is arranged to cooperate with the inclined edge 46 of the second element 49 for latching the same, and extends longitudinally for about the same length. The pintles 63 are arranged to form a hinge with the hook portions 42, for hinging the parts 12 and 13. The type hinge provided thereby permits parallel movement of one part relative to the other for a certain distance, due to the comparably great height of the hook portions 42, while at the same time restraining complete removal of one part from the other since they are hinged at one end.

When the parts 12 and 13 are assembled after they were completely separated, or when they are assembled for the first time, the pintles 63 are slid between the free ends of the hook portions 42 and the resilient arms 47. Thereafter, when the camera is opened the pintles 63 and the hook portions 42 provide a hinge that is at once resilient and may easily be unhinged intentionally, but where unintentionally unhinging is substantially impossible. Since the hook portions 42 and the arms 47 are resilient, even a careless handling of the camera will neither unhinge the parts nor damage the hinge, as the hook portions 42 will resiliently yield and be prevented from being deformed permanently by the aid of the resiliency of the arms 47. An extreme application of bending force, when the camera parts are swung apart about the hinge is shown in Fig. 5 where the resilient yielding of the hinge is illustrated. The resiliency of the hinge is heightened by the fact that the connecting piece 58 of the second latch also yields in that position, and after release, all the parts normally return to their previous position and shape.

The advantages of the instant camera latching are numerous. The front and the rear parts may be accurately dimensioned and the shoulder 22 and recess 20 be sufficiently wide to prevent the entry of light into the closed camera. This is only possible, at a propitious degree, where the parts are put together or moved apart while parallel to each other, instead of being restricted to relative rotational movement to each other, as it is the case with hinges as they have formerly been used. The parts may be easily taken apart and put together, by parallel movement, and yet they are hinged together so that accidental loss of one part is prevented. Moreover, a parallel as well as rotational movement of one part relative to the other is made possible and thereby a quicker opening and more ready accessibility to the camera are made possible.

Furthermore, the latching mechanism as well as the hinge are concealed when the camera is closed and therefore the streamline of the camera exterior is not marred by the unsightly appearance of either a hinge or a lock. Only the ends of the rivets that are sunken into the outer surface, are visible from the outside when the camera is closed.

It will be apparent to those skilled in the art that the novel principles of the invention disclosed herein in connection with specific exemplifications thereof will suggest various other modifications and applications of the same.

It is accordingly desired that in construing the breadth of the appended claims they shall not be limited to the specific exemplifications of the invention described herein.

Having thus described the invention, what I claim as new and desire to be secured by Letters Patent, is as follows:

1. Latching means, for use in connection with a camera including two separate parts adapted to fit accurately and light tight upon one another, said latching means adapted to hold said parts together and comprising, in combination, an element secured to said one part and including an inwardly projecting portion, a resilient latch secured to said other part opposite said element including an outwardly projecting portion adapted to interengage with said inwardly projecting portion of said element for latching the same, a second element secured to said one part and including an inwardly projecting portion, a pair of spaced integral hooks, and two integral spaced resilient arms, each arm extending near the end portion of a hook, and a second latch for cooperation with said second element and for providing therewith a hinge connection for said camera parts, said second latch secured to said other part opposite said second element and including an outwardly projecting portion adapted to interengage with said inwardly projecting portion of said second element for latching the same, a loop at the end of said outwardly projecting portion and a pin surrounded and held by said loop and having two free ends extending laterally thereof, each end adapted to engage a hook when said parts are unlatched, thereby resiliently restraining complete severance of one part from the other, each arm of said second element bearing from the outside against the end of a hook to restrain outward bending thereof when under pressure by said pin.

2. Two latching elements, for use in connection with a camera including two separable parts adapted to be fitted to each other in light tight closure relation; said latching elements adapted to cooperate for holding said parts together, one of said elements being secured to one of said parts and composed of a single piece of material and including an angular portion having a projecting edge and an inclined surface adjacent said edge, two spaced hook portions each adjoining an end of said edge, and two resilient portions each adjacent a hook portion, said other element being secured to said other camera part and including a resiliently supported elongated slanting surface, and a pintle extending from each longitudinal end of said slanting surface, said slanting surface disposed opposite said edge of said first element when two camera parts are brought towards closure for resiliently passing thereover to engage said inclined surface, whereby said two elements are latched and said parts held together, said pintles arranged to slide between said hook portions and said resilient portions for subsequently hinging said parts together so that they may be taken apart but not unintentionally removed one from another completely, said pintles being in engagement with the inside of said hook portions for restraining such removal.

3. Combined latching and hinge means for use in connection with a camera including two separable parts adapted to fit accurately and light tight upon one another in closure position, said means comprising a latching element disposed in each camera part opposite that of the other part for cooperation therewith to latch said camera parts in closure position, each element including an inclined latch surface for engaging that of the other and one element having an extension near its said surface forming a normally closed loop, and the other element having a pintle near its said surface and arranged to be disposed in said loop and adapted to move within said loop for forming therewith a hinge permitting relative movement of said parts about said hinge and said pintle being restrained from movement laterally of said loop for restraining disengagement, said loop having a portion resiliently movable relative to the remaining portions of said loop for intentionally removing said pintle from said loop.

4. In a camera body, two body parts, one adapted to fit accurately upon the other to enclose a light-tight chamber, said parts being separable and independent from one another, in combination with locking means connected to said camera parts for holding the same together in closure position, said locking means disposed entirely within said chamber to be concealed from the outside of said camera and comprising two spaced elements secured to one part and disposed for at least a major portion within the confines thereof and two latches secured to said other part and spaced from each other for substantially the same distances as said elements and opposite relative thereto when said parts are aligned for closure engagement, each of said latches projecting beyond the confines of said other part and arranged to engage said elements when said parts are fitted to each other, each element including a substantially immovable inclined surface and an edge and each latch including a resiliently slanting surface adapted to slide over said edge and to engage said inclined surface sufficiently strongly for locking said camera parts together, and sufficiently resiliently for yielding to release the same when said parts are forced apart.

MORRIS KAPLOWITZ.

REFERENCES CITED

The following references are of record in the file of this patent:

UNITED STATES PATENTS

| Number | Name | Date |
|---|---|---|
| 505,480 | Pletcher | Sept. 26, 1893 |
| 749,738 | Locke | Jan. 19, 1904 |
| 1,033,525 | Bornmann | July 23, 1912 |
| 1,175,603 | Clausen | Mar. 14, 1916 |
| 1,352,171 | Bradley | Sept. 7, 1920 |
| 1,740,866 | McBarron | Dec. 24, 1929 |
| 2,029,913 | Crumrine | Feb. 4, 1936 |
| 2,078,432 | Whitlock | Apr. 27, 1937 |
| 2,253,090 | Peterson | Aug. 19, 1941 |
| 2,409,605 | Bolsey | Oct. 15, 1946 |
| 2,453,476 | Troidl | Nov. 9, 1948 |

FOREIGN PATENTS

| Number | Country | Date |
|---|---|---|
| 268,647 | Great Britain | Apr. 7, 1927 |
| 307,744 | Great Britain | Sept. 19, 1929 |